United States Patent
Feng et al.

(10) Patent No.: US 11,461,012 B2
(45) Date of Patent: Oct. 4, 2022

(54) NON-DISRUPTIVE DATA MIGRATION FROM A SOURCE STORAGE ARRAY TO A DESTINATION STORAGE ARRAY

(71) Applicant: EMC IP Holding Company LLC, Hopkinton, MA (US)

(72) Inventors: Changyu Feng, Beijing (CN); Yousheng Liu, Beijing (CN); Haiying Tang, Beijing (CN); Xiaobo Zhang, Beijing (CN); Sihang Xia, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 101 days.

(21) Appl. No.: 16/592,837

(22) Filed: Oct. 4, 2019

(65) Prior Publication Data

US 2020/0133508 A1 Apr. 30, 2020

(30) Foreign Application Priority Data

Oct. 31, 2018 (CN) .......................... 201811289378.2

(51) Int. Cl.
*G06F 3/06* (2006.01)

(52) U.S. Cl.
CPC ............ *G06F 3/0613* (2013.01); *G06F 3/064* (2013.01); *G06F 3/0617* (2013.01); *G06F 3/0647* (2013.01); *G06F 3/0653* (2013.01); *G06F 3/0659* (2013.01); *G06F 3/0689* (2013.01)

(58) Field of Classification Search
None
See application file for complete search history.

(56) References Cited

U.S. PATENT DOCUMENTS

| 7,233,977 | B2 | 6/2007 | Gupta et al. |
| 7,996,574 | B2 | 8/2011 | Gupta et al. |
| 9,411,819 | B1* | 8/2016 | Long ..................... H04L 41/082 |
| 9,830,105 | B1* | 11/2017 | Tummala .............. G06F 3/0617 |
| 10,037,157 | B1* | 7/2018 | Koli ....................... G06F 3/0665 |
| 10,545,668 | B2 | 1/2020 | Feng et al. |
| 2004/0080558 | A1* | 4/2004 | Blumenau ........... G06F 11/1435 347/19 |
| 2015/0213032 | A1* | 7/2015 | Powell .................... G06F 3/067 707/827 |
| 2017/0242627 | A1* | 8/2017 | Mills ...................... G06F 3/0659 |
| 2019/0179687 | A1* | 6/2019 | Wilkinson ............. G06F 11/079 |

OTHER PUBLICATIONS

Ali Mashtizadeh, Emré Celebi, Tai Garfinkel, and Min Cai. 2011. The design and evolution of live storage migration in VMware ESX. In Proceedings of the 2011 USENIX conference on USENIX annual technical conference (USENIXATC'11). USENIX Association, USA, 14. (Year: 2011).*

* cited by examiner

*Primary Examiner* — Edward J Dudek, Jr.
*Assistant Examiner* — Ralph A Verderamo, III
(74) *Attorney, Agent, or Firm* — BainwoodHuang

(57) ABSTRACT

Data access techniques involve: determining whether there is a copy operation that is being performed from a first LU to a second LU in response to receiving a write operation request for a first data block in the first logic unit (LU); detecting a copy status of data in the first data block in response to determining that there is the copy operation that is being performed; and determining a processing strategy of the write operation request during execution of the copy operation based on the copy status.

17 Claims, 12 Drawing Sheets

14
NON-DISRUPTIVE DATA MIGRATION FROM A SOURCE STORAGE ARRAY TO A DESTINATION STORAGE ARRAY

CROSS-REFERENCE TO RELATED APPLICATION

This application claims priority to Chinese Patent Application No. CN201811289378.2, on file at the China National Intellectual Property Administration (CNIPA), having a filing date of Oct. 31, 2018, and having "DATA ACCESS METHOD, DEVICE AND COMPUTER PROGRAM PRODUCT" as a title, the contents and teachings of which are herein incorporated by reference in their entirety.

FIELD

Embodiments of the present disclosure generally relate to storage systems, and more particularly to a data access method, device, and computer program product for use in storage systems.

BACKGROUND

Moving volumes between data storage arrays is a use case in storage industry. For example, upon doing hardware upgrade or capacity balance, it is necessary to move volumes between storage systems. Almost all storage systems support pushing/pulling volumes to/from external data storage arrays, but most of them only support cold data migration. This means that all read/write operations (also called input/output operations, briefly called I/O operations) from a host to a source array must be stopped while migration is going on.

Some storage systems support seamless data movement, but the premise is that both the source array and destination array need to be aware of the migration. Therefore, these technical solutions cannot be used to move volume between arrays from different vendors. In addition, since these technical solutions usually use a "pull" mode, all data, including the "hole" in the source volume, need to be forwarded to the destination array. Therefore, such operation is inefficient and wastes the bandwidth between the arrays. In addition, in some storage systems, if the read operation from the host falls into the range which has not been copied, the read operation must be forwarded to the source volume. This also causes inefficiency and bandwidth waste.

SUMMARY

The present disclosure provides a solution of not disrupting I/O operations from a host level while migrating (or copying) data from a destination storage array to a target data storage system. In addition, after the data migration operation is completed, it is also possible to "seamlessly" switch an access path for serving subsequent host I/O operations from a path connected to the source array to a path connected to the destination array, so as to cause the destination array to automatically respond to subsequent I/O requests.

A first aspect of the present disclosure provides a data access method, including: in response to receiving a write operation request for a first data block in a first logic unit (LU), determining whether there is a copy operation that is being performed from the first LU to a second LU; in response to determining that there is the copy operation that is being performed, detecting a copy status of data in the first data block; and determining based on the copy status a processing strategy of the write operation request during the performing of the copy operation. In this manner, the I/O operations at the host level are not interrupted during the migration (or copy) of the data from the source storage array to the destination storage array.

In some embodiments, the determining a processing strategy of the write operation request includes: in response to the copy status indicating that data in the first data block is not copied, performing the write operation for the first data block. As the data block is not yet copied, the write operation may be performed directly to the source array without affecting the copy of the data block to the destination array. This is because, the first data block whose data content is updated by the write operation can be copied subsequently to the destination array.

In some embodiments, the determining a processing strategy of the write operation request includes: in response to the copy status indicating that data in the first data block is being copied, delaying a write operation for the first data block. In some embodiments, the method further includes: in response to detecting that the copy status becomes a status indicating that data in the first data block is already copied, performing the write operation for the first data block. For example, it is possible to first add the write operation to a queue, and send the write operation added to the queue again after a target data segment is copied to the destination volume. In this way, there is no need to interrupt I/O operations at the host level while the data copy process is ensured.

In some embodiments, the determining a processing strategy of the write operation request includes: in response to detecting that the copy status becomes a status indicating that data in the first data block is already copied, performing a write operation for data in the first data block; and performing the write operation for data that is in the second LU and in the second data block corresponding to the first data block, wherein the data in the second data block is a copy of the data in the first data block.

This ensures that the data in the first data block in the first LU and the data in the corresponding second data block in the second LU are always be kept consistent before the data migration from the first LU to the second LU is completely finished.

In some embodiments, the method further includes: prior to the beginning of the copy operation, creating a first set of access paths from the host to a first set of disks; creating a mapping relationship from the first LU to the second LU; and creating a second set of access paths from the host to a second set of disks. In some embodiments, the method further includes: after a completion of the copy operation, in response to receiving a further request of the write operation for the first data block, switching a path for data access from one access path in a first set of access paths to an access path in a second set of access paths, so that a response to the further request is made with the second LU.

In this way, after the entire copy operation ends in the future, it only needs to perform the path flip to "seamlessly" switch the path for serving subsequent host level I/O operations from a path connected to the source array to the second set of paths connected to the destination array.

In some embodiments, the method further includes: performing the copy operation, wherein performing the copy operation includes: in response to detecting that the data in the first data block is zero, skipping a copy operation for the data in the first data block.

Compared with a conventional technical solution in which all data (including "hole") in the source array are usually forwarded to the destination array, such skip of "hole" during data migration will save bandwidth between the source array and the destination array.

A second aspect of the present disclosure provides a data access device, including: a processing unit; and a memory coupled to the processing unit and storing instructions that, when executed by the processing unit, perform the following acts: determining whether there is a copy operation that is being performed from a first LU to a second LU in response to receiving a request of a write operation for a first data block in the first logic unit (LU); detecting a copy status of data in the first data block in response to determining that there is the copy operation that is being performed; and determining a processing strategy of request of the write operation during performance of the copy operation based on the copy status.

A third aspect of the present disclosure provides a computer program product tangibly stored on a non-transitory computer readable medium and including machine executable instructions that, when executed, cause a machine to perform the steps of the method according to the first aspect of the present disclosure.

BRIEF DESCRIPTION OF THE DRAWINGS

The drawings described herein are provided to further illustrate the present disclosure and form a part of the present disclosure. The example embodiments of the present disclosure and the description thereof are used to illustrate the present disclosure, and do not unduly limit the present disclosure.

In the figures, the same or similar reference numerals are used to denote the same or similar elements.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

As stated above, most of currently available storage systems only support cold data migration. This means that all read/write operations (also called input/output operations, briefly called I/O operations) from a host to a source logic unit (LU) must be stopped while migration is going on.

To this end, various embodiments of the present disclosure provide a solution where an I/O operation from the host is not interrupted during the migration (or copy) of the data from a source storage array to a destination data storage array. In addition, after the data migration operation is completed, it is further possible to "seamlessly" switch an access path for serving subsequent host I/O operations from a path connected to the source data storage array (hereinafter simply referred to as "source array") to a path connected to the destination data storage array (hereafter referred to as "destination array").

Figure 1:
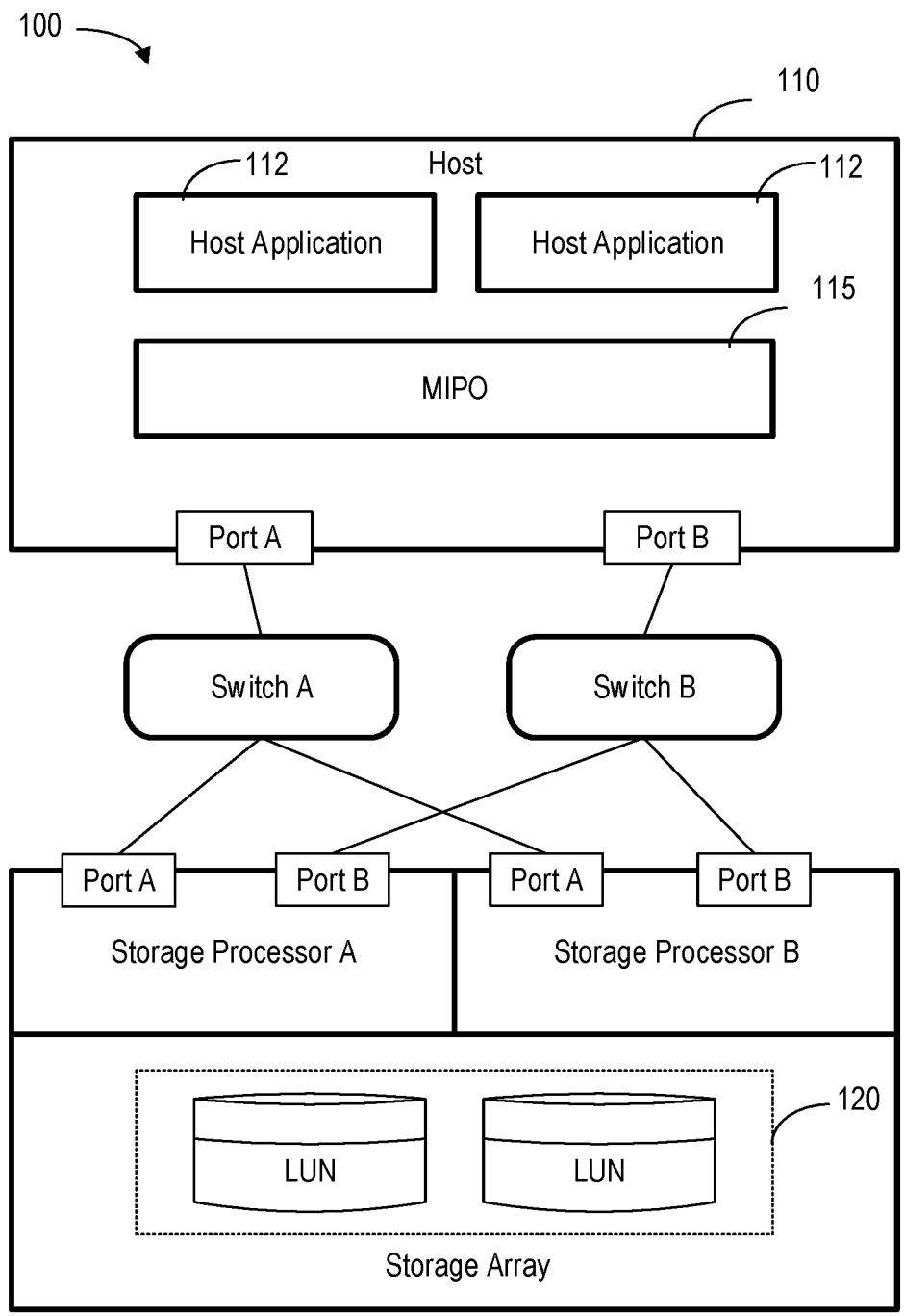
FIG. 1 illustrates a typical configuration of a storage array with dual storage processors.

FIG. 1 illustrates a typical configuration 100 of a storage array 120 with dual storage processors. As shown in FIG. 1, in modern data centers, there are usually multiple paths from a host 110 to a storage array 120 for achieving high availability and dynamic load balancing. For example, in the example as illustrated in FIG. 1, four paths from the host 110 to the data storage array 12 are shown. The four paths are respectively connected from two ports of the host (namely, port A, port B) via two switches (namely, switch A, switch B), for example, optical fiber switches, to four ports of the storage array.

Figure 2:
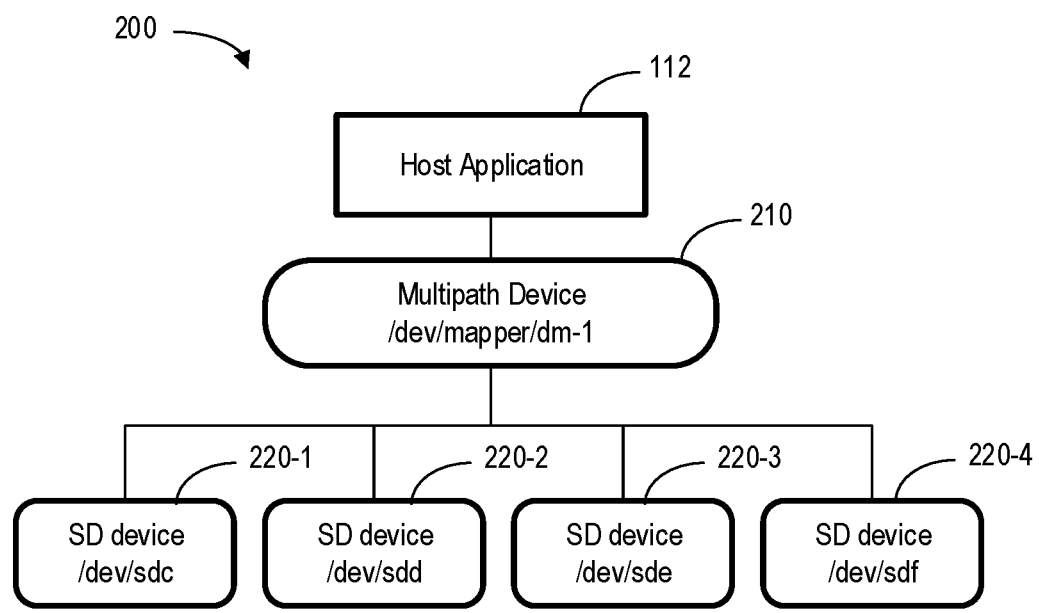
FIG. 2 illustrates an example of device mapping.

Referring next to FIG. 2, the operating system on the host treats each path as one physical device (i.e., a disk). In the configuration shown in FIG. 1, from the perspective of the operating system, the host will consider the four paths as four physical devices 220-1, 220-2, 220-3, and 220-4. As shown in FIG. 2, the four physical devices are identified as "/dev/sdc", "/dev/sdd", "/dev/sde", and "/dev/sdf", respectively, under a Linux operating system.

In addition, the host usually further includes a multi-pathing software (MPIO) 115 as a component of the operating system. The multi-pathing software may map the four physical devices into a multipath mapping device 210 (which is identified as "/dev/mapper/dm-1" in FIG. 2), and then publish the single multipath mapping device 210 to a host application 112. With such a configuration, the host 110 may access a single logical unit (LU) via multiple paths. It should be noted that in this text, "logical unit" may also be referred to as "volume", namely, two terms are interchangeable.

The MPIO 115 may detect all available physical devices on the system and then use a Small Computer System Interface (SCSI) query command to retrieve information of the device from the storage array 120. The multi-pathing software may identify whether two (or more) devices are the same device based on an identifier (for example, WWN).

Further referring to FIG. 2, upon receiving a read/write operation request (also referred to as an I/O request) from the host application 112, the MPIO 115 selects a path from the available multiple paths to send the I/O request to the storage array 120, to complete the read/write request for disk devices.

In addition, the MPIO 115 also supports a mode in which MPIO 115 returns a sense code when I/O failed on the selected path (namely, when sensing that a path connected to an external storage failed). Usually, the MIPO either directly returns an "I/O failure information" to the host application 112 or automatically selects another path to send the I/O request to the storage array 120 again.

Figure 3:
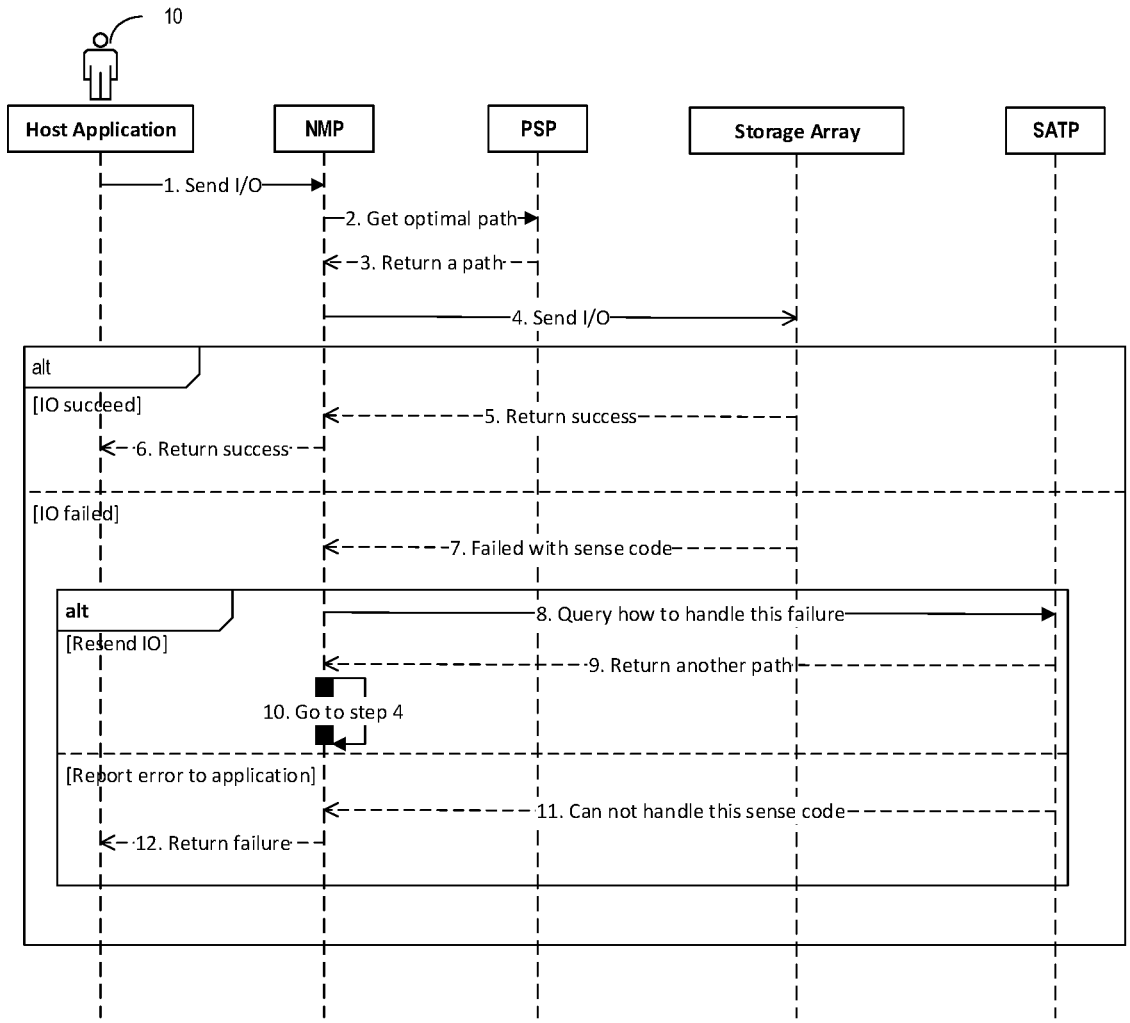
FIG. 3 illustrates an I/O handling flow of inherent multi-pathing software in VMware.

FIG. 3 illustrates an I/O handling flow of inherent multi-pathing software in VMware. It should be noted that most MPIOs may support data storage array-specific plug-in to get more flexibility. For example, VMware Native Multi-Pathing (NMP) may support extra Storage Array Type Plug-in (SATP) and Path Selection Plug-in (PSP). Similarly, Windows native MPIO may support extra device-specific module (DSM).

For example, when the SATP knows how to process the sense code, it will return with another path for sending an I/O request to the storage array 120 (sub-step 9). When the SATP does not know how to process the sense code, it will return this failure to the host application (sub-step 11).

The inventors note that because the MPIO in the host may support the plug-in and updating its plug-in does not interrupt the host's I/O operations, the solution of the present disclosure may utilize a "customized" multi-pathing software plug-in (for example, under Linux, including SATP and PSP) along with a host agent 114 working together with the array, to push the volume seamlessly to the external array (namely, the destination array). In addition, the multi-pathing software stores a mapping between the source volume's identity and the destination volume's identity, there is no spoofing of source volume's identity at destination array. By using customized plug-in in multi-pathing software, this solution also apply to customers who use native multi-pathing software.

Figure 4:
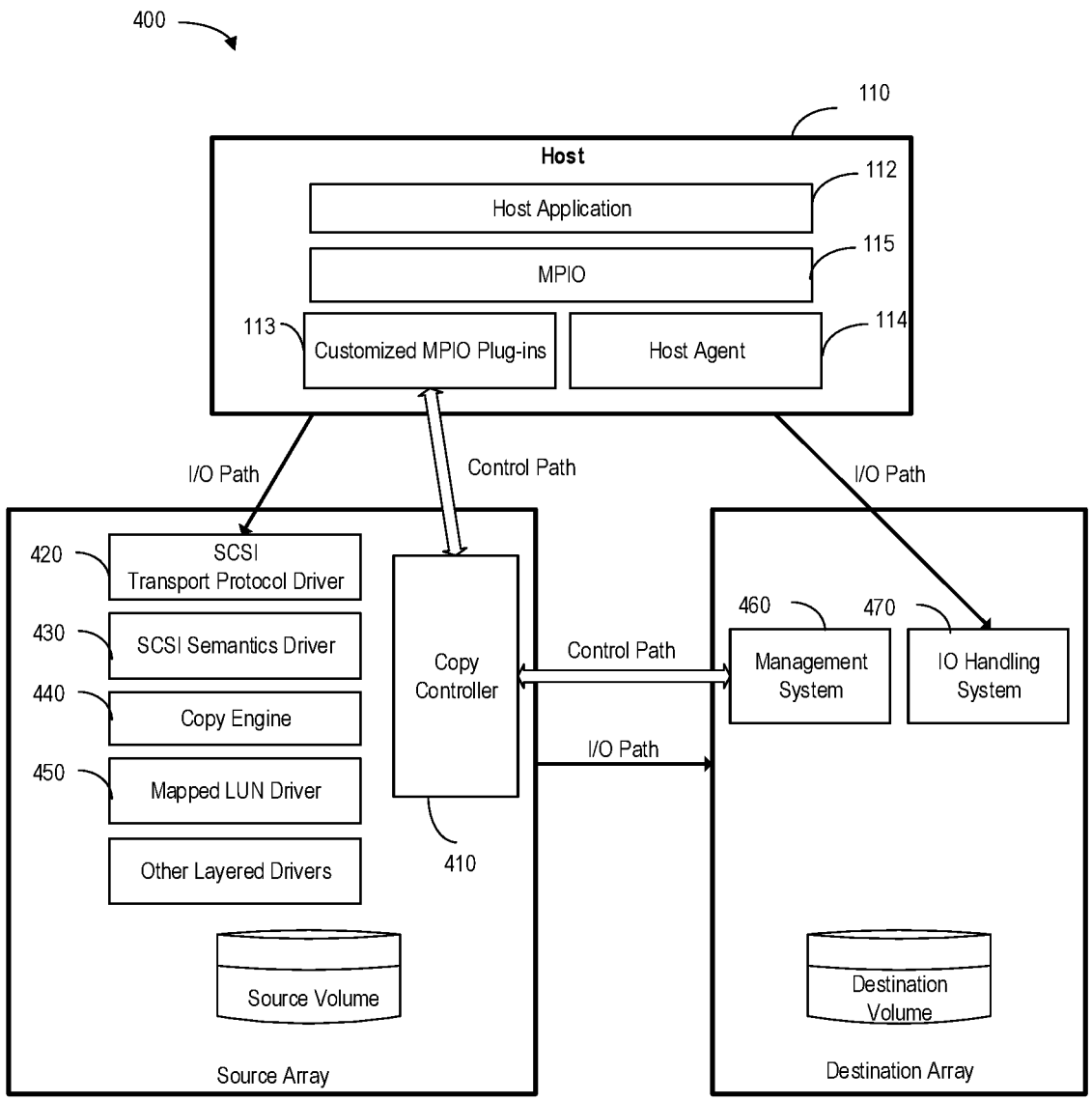
FIG. 4 illustrates a schematic block diagram of a storage system 400 for implementing a technical solution according to an embodiment of the present disclosure.

FIG. 4 illustrates a system architecture of a storage system 400 for implementing a technical solution according to an embodiment of the present disclosure. Functions of main components are listed below:

Customized MIPO plug-in 113: it is responsible for handling I/O from the host application 112 during LU movement. The MIPO plug-in 113 may understand the vendor-specific sense code from the array, as well as a specific function (IOCTL) for managing the I/O from the host agent 114, and then perform corresponding operations on the host 110.

Host Agent 114: it is used to receive the request from the copy controller 410 and send the IOCTL to the above-described customized plug-in 113 to cause the plug-in 113 to perform some operations. For example, the plug-in 113 is caused to perform a mapping between the destination volume WWN and the source volume WWN.

SCSI Transport Protocol Driver 420: this driver is a front-end driver for the data block, and it handles SCSI transport protocol communication between the host and the array, for example, Fibre Channel (FC) driver or Internet Small Computer System Interface (iSCSI)) driver.

SCSI Semantic Driver 430: it is used to parse a conventional SCSI command from the host and respond to the host.

Copy Engine 440: it is a layered driver and is only inserted into the I/O stack for a specific LU if the LU is actively involved in a copy session. Once the copy session completed, the associated driver is removed from the I/O stack. In addition, the copy engine 440 is responsible for reading data from the source volume and pushing data to the destination volume. The copy engine 440 also queues the write I/O from the drivers above, if the write range is being copied to the destination volume, or forwards the write I/O to the destination volume if the write range has been copied to the destination volume.

Mapped LUN driver 450: it is used to perform the mapping between the mapped LUN (public LUN) and the FLARE LUN (internal LUN) (here, the FLARE LUN refers to a conventional LUN, which does not support virtual resource assignment characteristics). In addition, the mapped LUN driver 450 further provides an interface which may be used by Copy Engine 440 to find the next allocated region in a special "read next" request. This function may let Copy Engine skip copying the un-allocated region ("hole") in the source volume. In addition, it returns a specific status for the read I/O if the read region is all zero. This is also helpful for avoiding copying unnecessary data.

Copy Controller 410: it is a control path component which is used to create a copy session and is responsible for monitoring the whole copy process.

The components on the third party array: it should provide a standard interface of a storage system. For example, the management system on the third party array should provide an interface that may be used to create volume and to get volume information. The 10 handling system 470 on the third party array should accept standard SCSI commands.

Figure 5:
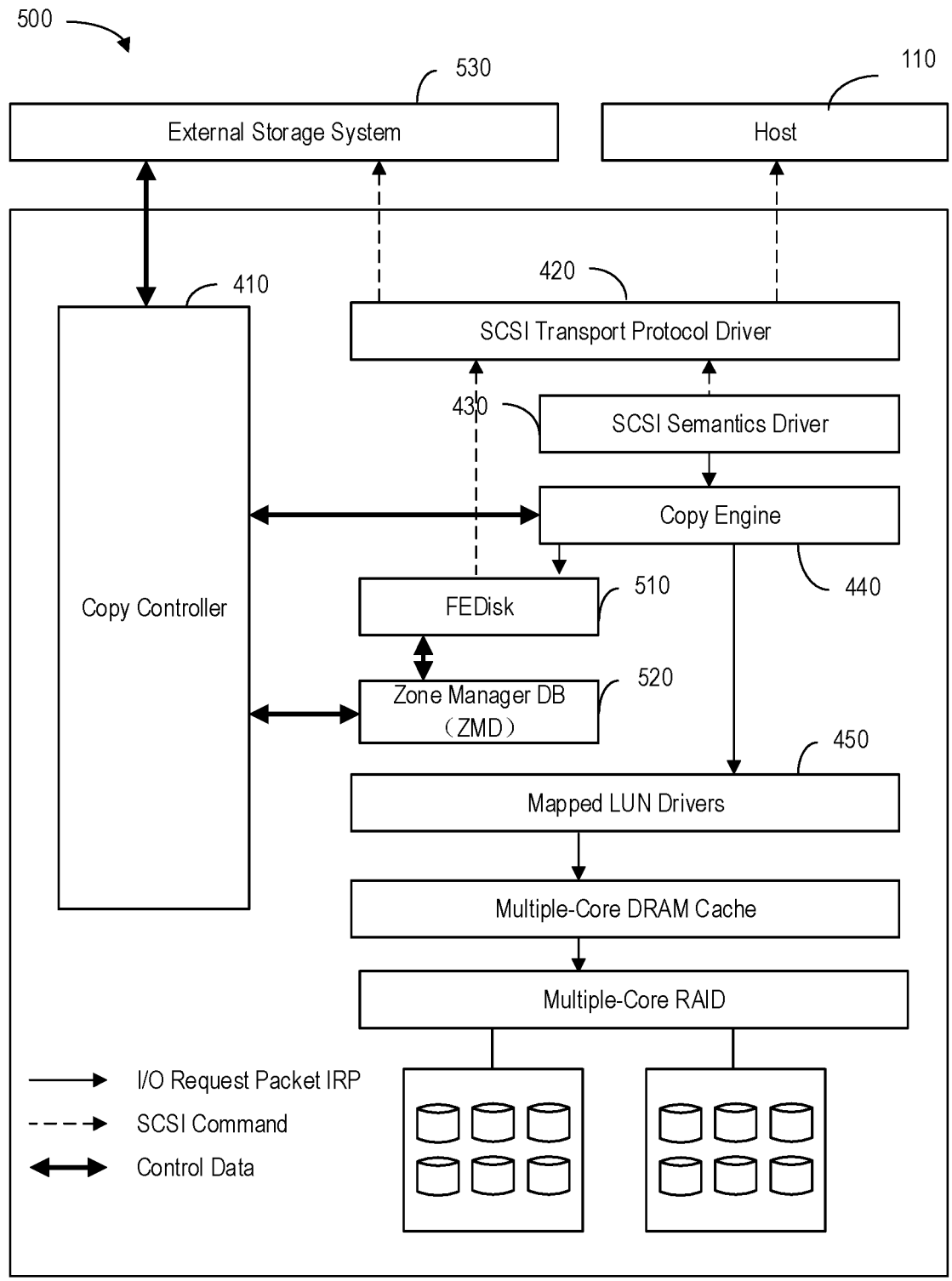
FIG. 5 is a schematic block diagram depicting interactions between various components in a storage system according to an embodiment of the present disclosure.

FIG. 5 depicts interactions between various components in a storage system according to an embodiment of the present disclosure. The functions of most components are described in FIG. 4. The following are descriptions of the additional components not shown in FIG. 4. The details of the interactions between the components will be described in the sections below.

Zone Manager DB (ZMD) 520: it is used to maintain named iSCSI paths for iSCSI target LU discovery. User inputs the IP, port, and authentication information of the target third party storage system into Copy Controller 410, then Copy Controller 410 invokes ZMD 520 interface to store the information. The Front-End Disk (FEDisk) 510 will get these information from ZMD 520 and login to the external storage system 530.

FEDisk 520: it is used to establish and validate FC and iSCSI connections to external storage system. For iSCSI, FEDisk 510 uses the ZMD 520 to get the iSCSI target information used to establish the iSCSI connection to the external storage system 530. For FC, the FEDisk 510 communicates with Miniport to get SAN devices discovered. FEDisk 510 translates internal I/O request format to SCSI protocol format and passes the I/O request to Front-End drivers to send to the external storage system 530.

Figure 6:
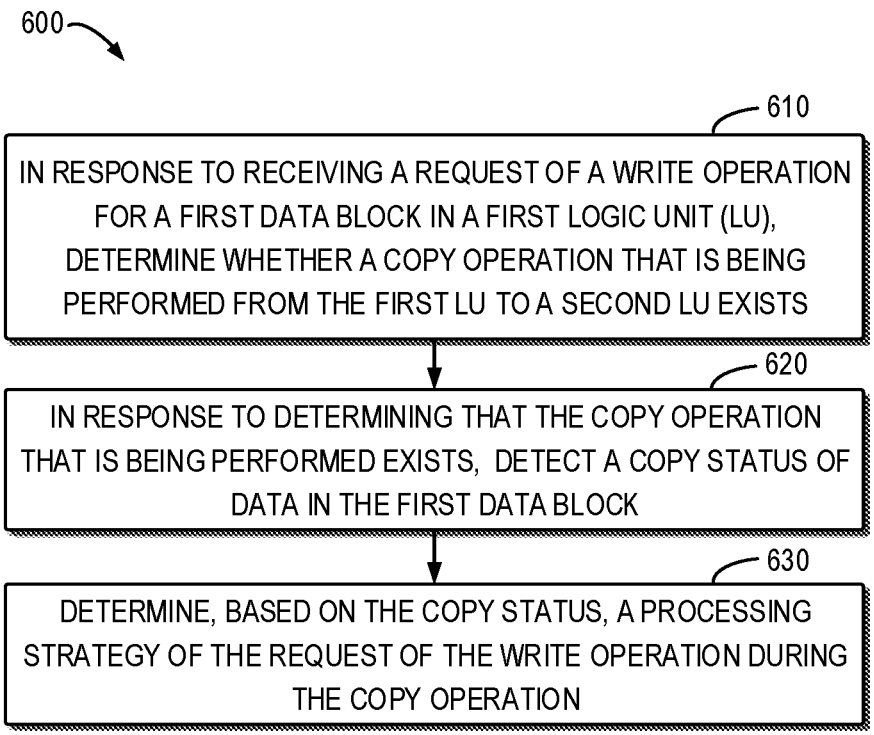
FIG. 6 illustrates a flow chart of a data access method according to an embodiment of the present disclosure.

FIG. 6 illustrates a flow chart of a data access method 600 according to an embodiment of the present disclosure. Method 600 may be performed in systems 400 and 500 as shown in FIG. 4 and FIG. 5 as described above.

As shown in FIG. 6, at 610, in response to receiving a request of a write operation for a first data block in a first LU (namely, the source LU), whether a copy operation that is being performed from the first LU to the second LU (namely, a target LU) exists is determined. For example, in some embodiments, a user may send a write operation request to the first LU through the host application. After the front-end driver of the first LU receives the write operation request, the write operation request is forwarded "layer by layer" from top to bottom to the driver of the next layer. In some embodiments, monitoring whether there is a copy operation that is performed from the first LU to the second LU may be performed by the Copy Controller 410 as shown in FIG. 4.

At 620, in response to determining that a copy operation being performed exists, a copy status of the data in the first data block is detected. The copy status includes, but not limited to, "not copied", "being copied", and "already copied". The detection of the copy status may also be performed by the Copy Controller 410. At 630, a processing strategy of the request of the write operation during the performance of the copy operation is determined based on the copy status.

Unlike the conventional manner, according to various embodiments of the present disclosure, I/O operations at the host level are not interrupted due to the presence of an ongoing data copy operation.

In some embodiments, before creating a copy session, some pre-configuration works should be done, which includes: updating the customized MPIO plug-in and Host Agent on the host system, and setting up the network connection and control path connection among the host, source array and destination array.

Figure 7:
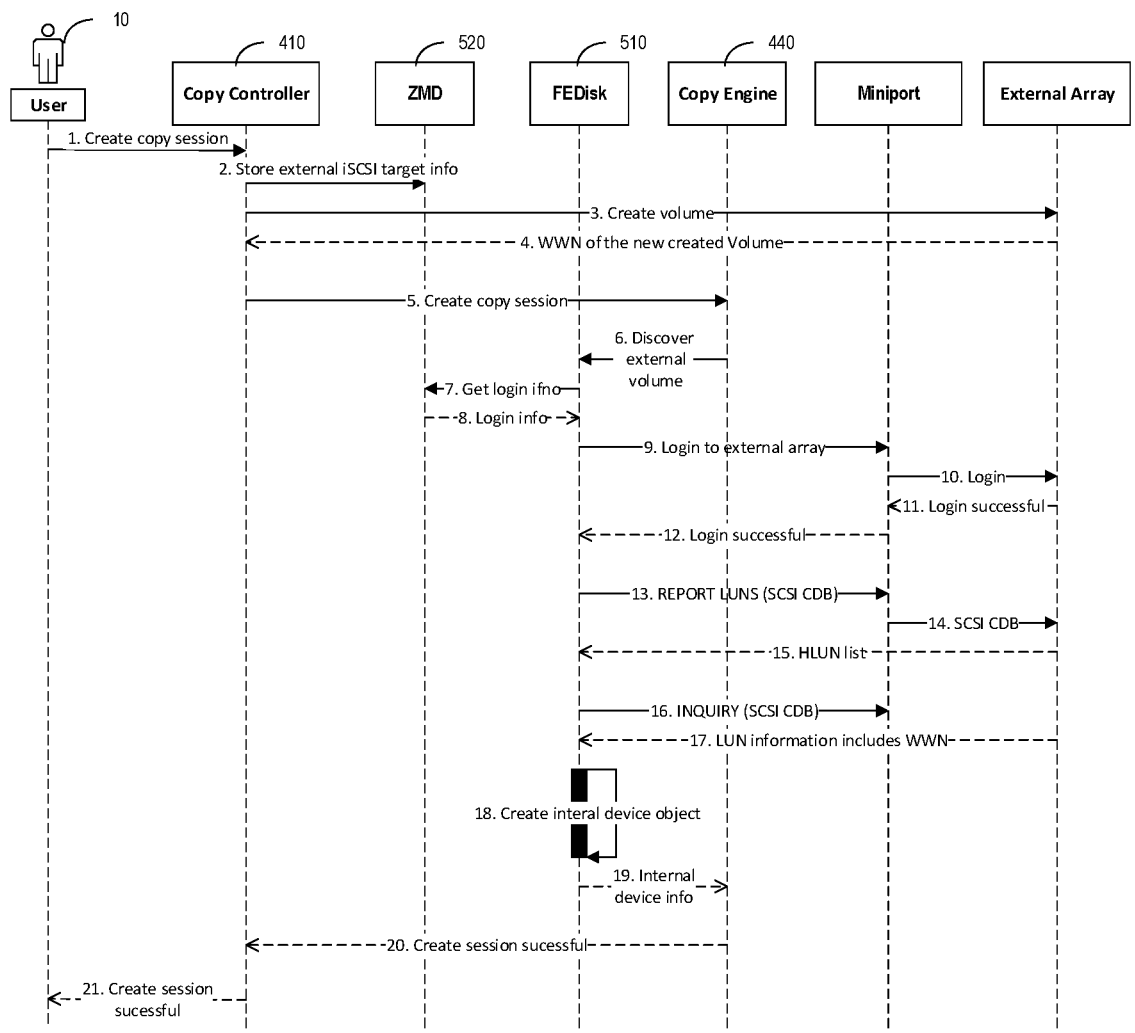
FIG. 7 depicts a sequence diagram of a process of creating a copy session according to an embodiment of the present disclosure.

FIG. 7 depicts a sequence diagram of a process of creating a copy session. As shown in FIG. 7, at sub-step 1, the user needs to enter the IP address, IP port and authentication information of the management interface of the external array. If the source array and destination array are connected via iSCSI, the user 10 also needs to enter the IP address, IP port, and identity authentication information of the external iSCSI target. It should be noted that sub-step 2 and sub-steps 7 through 12 need to be performed only when the two arrays are connected via iSCSI. If the two arrays are connected via FC, the miniport may automatically discover the SCSI target and log in to all discovered SCSI targets. In sub-step 18 and sub-step 19, FEDisk 510 creates an internal device object and then returns the handler for the internal device object to the copy engine 440. The copy engine 440 may use the handler to send a write I/O request to the FEDisk 510 after obtaining the handler. The FEDisk 510 then constructs a write SCSI command description block (CDB) that will be sent by the Miniport to the target storage system.

In some embodiments, prior to the beginning of the copy operation, it is necessary to create a first set of access paths from the host to the first set of disks; create a mapping relationship from the first LU to the second LU; and create a second set of access paths from the host to the second set of disks.

As discussed above, creating multiple access paths from host to disks may be accomplished through the customized MPIO plug-in 113. Creating a mapping relationship from the first LU to the second LU may also be implemented by the customized MPIO plug-in 113.

Figure 8:
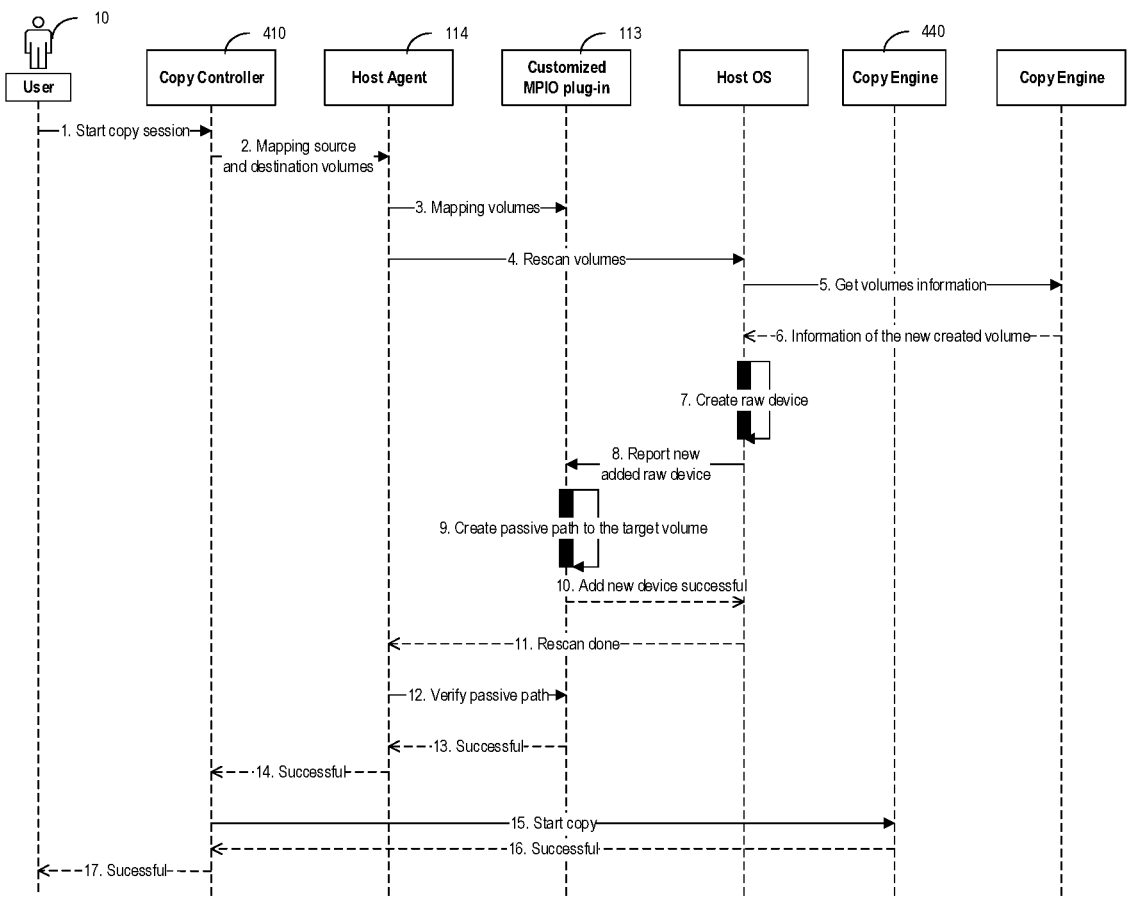
FIG. 8 illustrates a sequence diagram of a process of starting a copy session according to an embodiment of the present disclosure.

For example, FIG. 8 illustrates a sequence diagram of starting a copy session in accordance with an embodiment of the present disclosure. The customized MPIO plug-in 113 needs to set the mapping relationship between the source volume and the destination volume before the copy session is started. The necessary information (for example, WWN) is provided by the copy controller 410 to the host agent (sub-step 2), and then the host agent 114 invokes the customized MPIO plug-in 113 to perform a specific mapping of the two volumes (sub-step 3).

Continuing to refer to FIG. 8, sub-steps 4 through 11 describe the process after device mapping is completed by the customized MPIO plug-in 113. The purpose of sub-steps 4 through 11 is to place newly-created physical devices (representing the path to the destination volume) into the same multipath group as the physical devices (or paths) of the source volume. The only difference is that the devices/paths to the source volume are "active" whereas those to destination volume are "passive". This may ensure that I/O will not be interrupted at host level after copy session is completed. The customized MPIO plug-in only needs to perform a path switch (also called a "path flip") to direct new incoming I/O to the destination volume.

Figure 9:
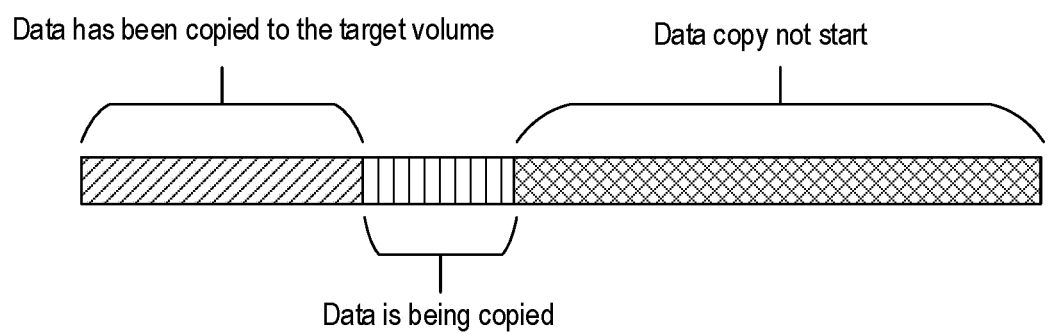
FIG. 9 illustrates handling of an I/O operation during a copy operation according to an embodiment of the present disclosure.

FIG. 9 illustrates handling of an I/O operation during a copy operation according to an embodiment of the present disclosure. As shown in FIG. 9, when copying data, the source volume is divided into a number of data segments. These data segments are copied sequentially. During volume migration, there are three types of regions on the source volume, namely, the region in which data has not yet been copied to the destination volume, the region in which data is being copied to the destination volume, and the region in which data has already been copied to the destination volume, as shown in FIG. 9.

For a read operation from the host, the Copy Engine 440 may directly forward it to the underlying drivers. For a write operation from the host, the Copy Engine 440 may activate different configuration from the above three configurations, depending on the region to be written, that is, formulating a corresponding write operation strategy, depending on the region to be written.

Specifically, in some embodiments, determining the processing strategy of the request of the write operation may include: performing the write operation for the first data block when the copy status indicates that the data in the first data block is 'not copied'. In other words, if the request of the write operation falls into a 'not copied' region, the copy engine 440 forwards the write operation directly to the underlying driver.

In some embodiments, determining the processing strategy of a request of a write operation includes: when the copy status indicates that the data in the first data block is 'being copied', delaying a write operation for the first data block. In some embodiments, when it is detected that the copy status changes to indicate that data in the first data block is already copied, a write operation for the first data block is performed. In other words, if the write operation falls into a region that is being copied, the copy engine 440 may first add the write operation to a queue, and resend the write operation added to the queue after the target data segment is copied to the destination volume.

In some embodiments, determining the processing strategy of the request of the write operation includes: when the copy status indicates that the data in the first data block is 'already copied', performing a write operation for data in the first data block, and performing a write operation for data that is in the second LU and in the second data block corresponding to the first data block, wherein the data in the second data block is a copy of the data in the first data block. That is, if the write operation falls into a region 'already copied', the write operation is forwarded to the underlying driver and meanwhile mirrored to the destination volume.

This write operation can be completed only when both the underlying physical disk and the destination array confirm that the write operation is complete.

Figure 10:
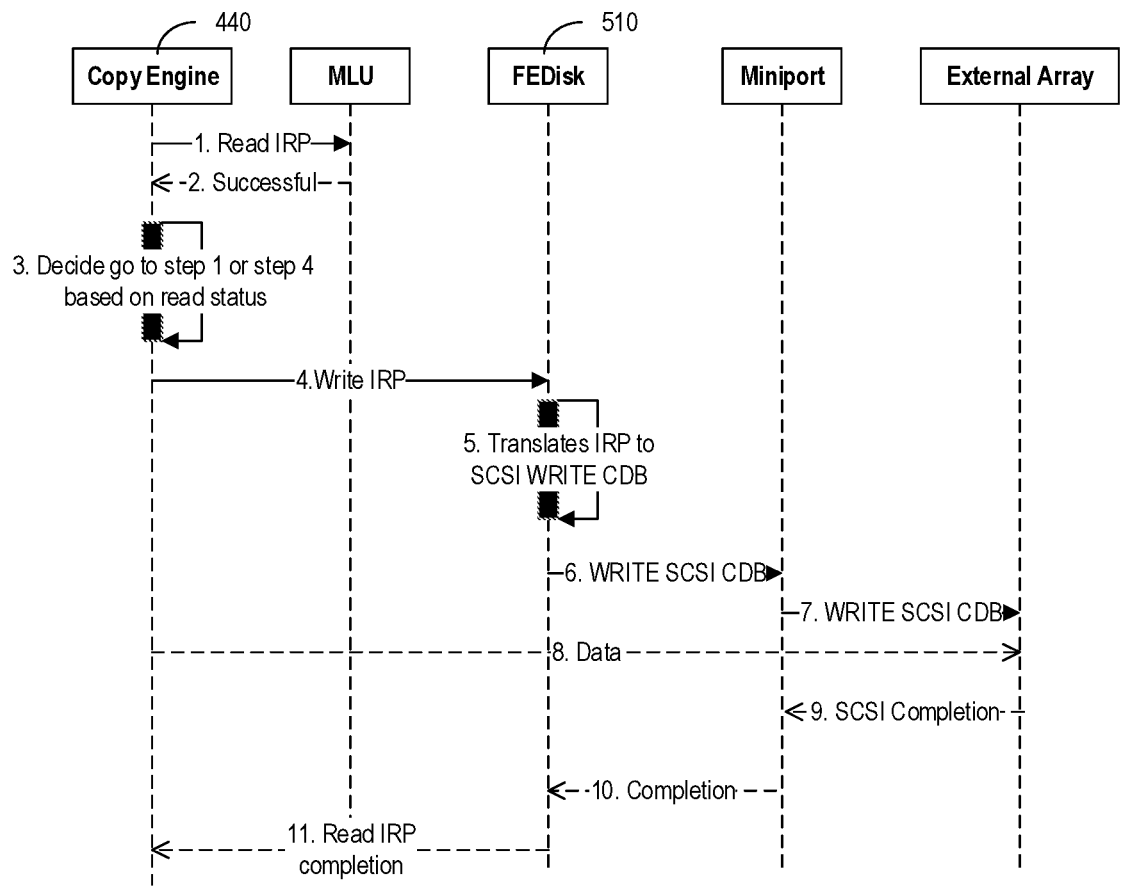
FIG. 10 illustrates a sequence diagram of copy session execution according to an embodiment of the present disclosure.

In some examples, performing the copy operation includes: skipping a copy operation for data in the first data block in response to detecting that the data in the first data block is zero. Specifically, during the copy performing phase, the copy engine 440 reads data from the underlying MLU and writes the data to the destination volume. FIG. 10 illustrates a sequence diagram of the data copying process. Basically, the copy engine 440 first sends a read operation to the MLU in the source volume to obtain the data. A write operation with data is then sent to the destination volume with the help of FEDisk 510. At sub-step 3, the copy engine 440 decides whether to continue to write the obtained data or to return to read another segment of data. This depends on the return status of the read operation. If the MLU completes the read operation and returns a special state named "all zero", the copy engine 440 may determine that these data are not needed to be written to the destination volume, and next read operation should be continued.

This provides a method to avoid copying the "hole" in the source volume to the destination volume, thereby saving bandwidth between the source array and destination array and accelerating the data migration process. In addition, it enables the configuration of destination volume on the third party system to be streamlined.

In sub-steps 5-7, FEDisk 510 receives a write operation from the copy engine 440 and converts the write operation to a SCSI write operation command, which may be sent to the destination volume via Miniport. In some embodiments, if a segment of data is being written to the destination volume, the next read-write cycle can be activated only when the current write operation is completed by the destination volume.

In some examples, after the completion of the copy operation, in response to receiving a further write operation request for the first data block, a path for data access from one access path in a first set of access paths is switched to an access path in a second set of access paths, so that the further write operation request is responded with the second LU.

Specifically, after the last data segment has been copied (namely, the entire copy operation ends), the copy engine 440 will abort all outstanding IO and reject incoming IO with a vendor-specific sense code. When receiving these sense code, the customized MPIO plug-in will start to queue the IO from host application. Then Copy Engine 440 notifies Copy Controller that the copy session has finished. Copy Controller 410 will inform Host Agent to let the customized MPIO plug-in perform the path flip and stop queuing IO.

Figure 11:
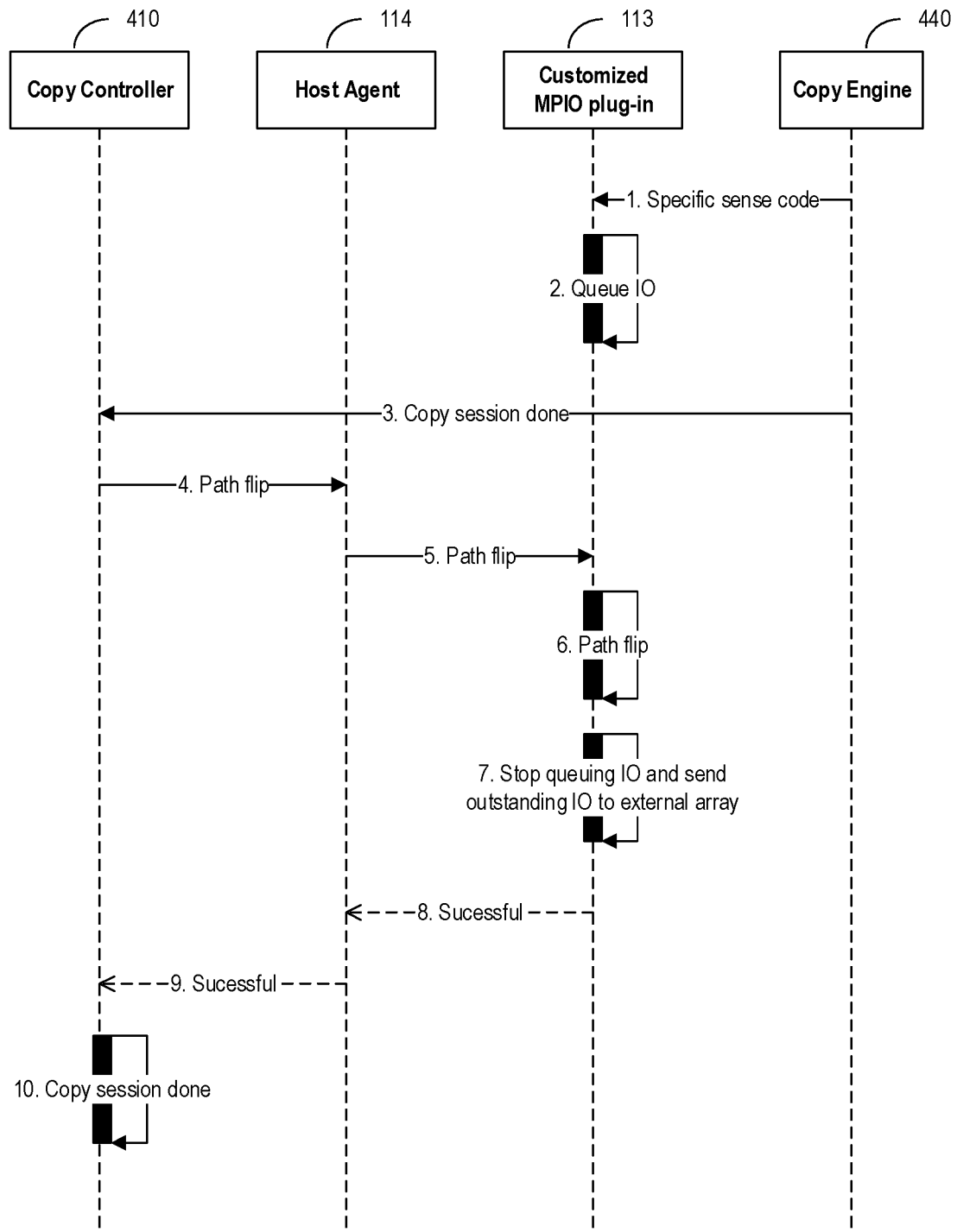
FIG. 11 illustrates a sequence diagram of data copy completion and path flip according to an embodiment of the present disclosure.

FIG. 11 shows the above steps. Among them, sub-step 6 and sub-step 7 are the main actions of the path flip. As discussed above with respect to FIG. 8, after the customized MPIO plug-in 113 completes device mapping, the newly-created physical devices (representing the path to the destination volume) may be placed into the same multipath group as the physical devices (or paths) of the source volume. The only difference is that the devices/paths to the source volume are "active" whereas those to destination volume are "passive". This may ensure that I/O will not be interrupted at host level after copy session is completed. The customized MPIO plug-in only needs to do the path flip to direct new incoming I/O to the destination volume. At sub-step 6, the host agent notifies the customized MPIO plug-in 113 that the copy session has completed. It then switches the active/passive state of the source/destination volume. In sub-step 7, the multi-pathing software with the customized MPIO plug-in 113 stops queuing incoming I/O and sends these I/Os again to the storage array. The difference is that after the path is flipped, the customized MPIO plug-in 113 will return the path to the destination volume as the best path for the multi-path software request to send I/O.

Figure 12:
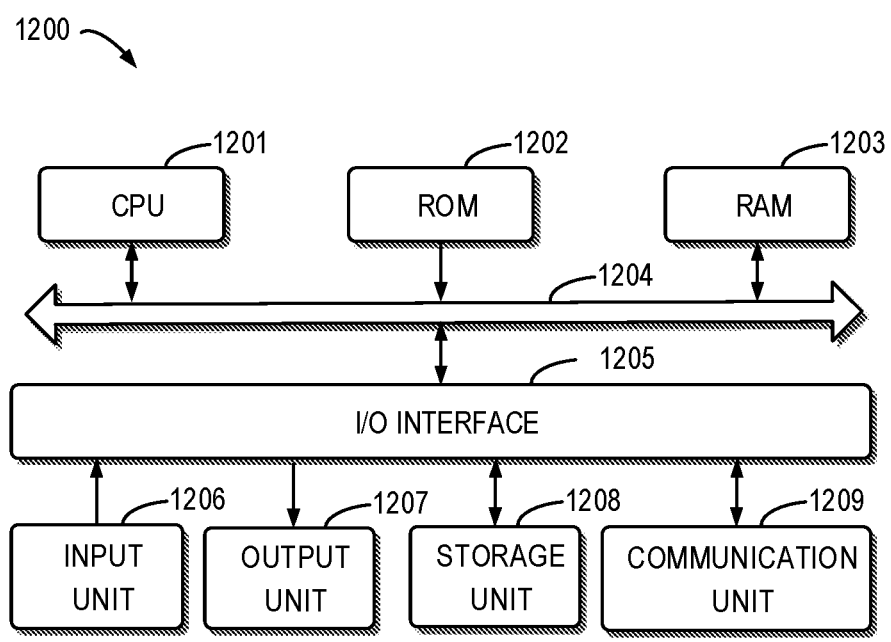
FIG. 12 illustrates a schematic block diagram of a device for implementing an embodiment of the present disclosure.

FIG. 12 illustrates a schematic block diagram of a device 1000 that may be used to implement an embodiment of the present disclosure. As shown in FIG. 12, the device 1200 includes a central processing unit (CPU) 1201 that may perform various proper acts and processing according to computer program instructions stored in a read only memory (ROM) 1202 or computer program instructions loaded from a storage unit 408 to a random access memory (RAM) 1203. In the RAM 1203, various programs and data required for the operation of the device 1200 may also be stored. The CPU 1201, the ROM 1202, and the RAM 1203 are connected to each other through a bus 404. An input/output (I/O) interface 405 is also coupled to the bus 1204.

A plurality of components in the device 1200 are coupled to an I/O interface 1205, including: an input unit 1206 such as a keyboard, a mouse and the like; an output unit 12012 including various kinds of displays and a loudspeaker, etc.; a storage unit 1208 such as a magnetic disk, an optical disk, and etc.; a communication unit 1209 such as a network card, a modem, and a wireless communication transceiver, etc. The communication unit 1209 allows the device 1200 to exchange information/data with other devices through a computer network such as the Internet and/or various kinds of telecommunications networks.

The various processes and handling described above, such as method 600, may be performed by the processing unit 1201. For example, in some embodiments, the method 600 may be implemented as a computer software program that is tangibly embodied in a machine readable medium, such as the storage unit 1208. In some embodiments, part or all of the computer program can be loaded and/or installed onto the device 1200 via ROM 1202 and/or communication unit 1209. One or more steps of the method 600 described above may be performed when a computer program is loaded into the RAM 1203 and executed by the CPU 1201. Alternatively, in other embodiments, CPU 1201 may also be configured in any other suitable manner to implement the processes/methods described above.

It should be appreciated that the above detailed embodiments of the present disclosure are only intended to illustrate or explain principles of the present disclosure, not to limit the present disclosure. Therefore, any modifications, equivalents, and improvements without departing from the spirit and scope of the present disclosure should all be included in the protection scope of the present disclosure. In the meantime, the appended claims are intended to cover all changes and modifications falling within the scope and boundary of claims or equivalents of the scope and boundary.

We claim:

1. A data access method, comprising:
   in response to receiving a request of a write operation for a first data block in a first logic unit (LU), determining whether a copy operation that is being performed from the first LU to a second LU exists;
   in response to determining that the copy operation that is being performed exists, detecting a copy status of data in the first data block;
   determining, based on the copy status, a processing strategy of the request of the write operation during the copy operation;

performing the copy operation, wherein performing the copy operation comprises:
  in response to detecting that the data in the first data block is zero, determining that data read from the first LU need not be written to the second LU and skipping the copy operation for the data in the first data block, wherein the first data block comprises an un-allocated region of the first LU, and wherein skipping the copy operation for the data in the first data block further comprises performing a read next request that finds a next allocated region in the first LU and additionally returns a predetermined specific status in the event that the next allocated region contains all zeros;
wherein determining the processing strategy of the request of the write operation and performing the copy operation are both performed by a first layered driver in an I/O stack of the source array;
wherein the first layered driver is inserted into the I/O stack of the source array for performing the copy operation, and subsequently removed from the I/O stack of the source array responsive to completion of the copy operation; and
wherein the first layered driver performs the read next request by using an interface that is provided by a second layered driver contained within the I/O stack of the source array.

2. The method according to claim 1, wherein the determining a processing strategy of the request of the write operation comprises:
  in response to the copy status indicating that the data in the first data block is not copied, performing the write operation for the first data block.

3. The method according to claim 1, wherein the determining a processing strategy of the request of the write operation comprises:
  in response to the copy status indicating that data in the first data block is being copied, delaying the write operation for the first data block.

4. The method according to claim 3, further comprising:
  in response to detecting that the copy status becomes a status indicating that data in the first data block is already copied, performing the write operation for the data in the first data block.

5. The method according to claim 1, wherein the determining a processing strategy of the request of the write operation comprises:
  in response to the copy status indicating that data in the first data block is already copied,
  performing a write operation for data in the first data block; and
  performing a write operation for data that is in the second LU and in a second data block corresponding to the first data block, wherein the data in the second data block is a copy of the data in the first data block.

6. The method according to claim 1, further comprising:
prior to the beginning of the copy operation,
  creating a first set of access paths from a host to a first set of disks;
  creating a mapping relationship between the first LU and the second LU; and
  creating a second set of access paths from the host to a second set of disks.

7. The method according to claim 6, further comprising:
after a completion of the copy operation,
  in response to receiving a further request of a write operation for the first data block, switching a path for data access from an access path in the first set of access paths to an access path in the second set of access paths, so that a response to the further request is made with the second LU.

8. The method of claim 1, wherein the first layered driver i) queues write I/O that is directed to a write range that is currently being copied to the second LU, and ii) forwards, to the second LU, write I/O that is directed to a write range that has already been copied to the second LU.

9. The method of claim 8, wherein the second layered driver also maps the first LU to an internal LU of the source array.

10. A data access device, comprising:
  a processing unit; and
  a memory coupled to the processing unit and storing instructions that, when executed by the processing unit, perform the following acts:
    in response to receiving a request of a write operation for a first data block in a first logic unit (LU), determining whether a copy operation that is being performed from a first LU to a second LU exists;
    in response to determining that the copy operation that is being performed exists, detecting a copy status of data in the first data block;
    determining, based on the copy status, a processing strategy of the request of the write operation during execution of the copy operation;
    performing the copy operation, wherein performing the copy operation comprises:
      in response to detecting that the data in the first data block is zero, determining that data read from the first LU need not be written to the second LU and skipping the copy operation for the data in the first data block, wherein the first data block comprises an un-allocated region of the first LU, and wherein skipping the copy operation for the data in the first data block further comprises performing a read next request that finds a next allocated region in the first LU and additionally returns a predetermined specific status in the event that the next allocated region contains all zeros;
    wherein determining the processing strategy of the request of the write operation and performing the copy operation are both performed by a first layered driver in an I/O stack of the source array;
    wherein the first layered driver is inserted into the I/O stack of the source array for performing the copy operation, and subsequently removed from the I/O stack of the source array responsive to completion of the copy operation; and
    wherein the first layered driver performs the read next request by using an interface that is provided by a second layered driver contained within the I/O stack of the source array.

11. The device according to claim 10, wherein the determining a processing strategy of the request of the write operation comprises:
  performing the write operation for the first data block in response to the copy status indicating that data in the first data block is not copied.

12. The device according to claim 10, wherein the determining a processing strategy of the request of the write operation comprises:
  in response to the copy status indicating that data in the first data block is being copied, delaying the write operation for the first data block.

13. The device according to claim 12, wherein the acts further comprise:
    in response to detecting that the copy status becomes a status indicating that data in the first data block is already copied, performing the write operation for the data in the first data block.

14. The device according to claim 10, wherein the determining a processing strategy of the request of the write operation comprises:
    in response to the copy status indicating that data in the first data block is already copied,
        performing a write operation for data in the first data block; and
        performing a write operation for data that is in the second LU and in a second data block corresponding to the first data block, wherein the data in the second data block is a copy of the data in the first data block.

15. The device according to claim 10, wherein the acts further comprise:
    prior to the beginning of the copy operation,
        creating a first set of access paths from a host to a first set of disks;
        creating a mapping relationship between the first LU and the second LU; and
        creating a second set of access paths from the host to a second set of disks.

16. The device according to claim 15, wherein the acts further comprise:
    after a completion of the copy operation,
        in response to receiving a further request of a write operation for the first data block, switching a path for data access from an access path in the first set of access paths to an access path in the second set of access paths, so that a response to the further request is made with the second LU.

17. A computer program product having a non-transitory computer readable medium which stores a set of instructions to perform data access; the set of instructions, when carried out by computerized circuitry, causing the computerized circuitry to perform a method of:
    in response to receiving a request of a write operation for a first data block in a first logic unit (LU), determining whether a copy operation that is being performed from the first LU to a second LU exists;
    in response to determining that the copy operation that is being performed exists, detecting a copy status of data in the first data block;
    determining, based on the copy status, a processing strategy of the request of the write operation during the copy operation;
    performing the copy operation, wherein performing the copy operation comprises:
        in response to detecting that the data in the first data block is zero, determining that data read from the first LU need not be written to the second LU and skipping the copy operation for the data in the first data block, wherein the first data block comprises an un-allocated region of the first LU, and wherein skipping the copy operation for the data in the first data block further comprises performing a read next request that finds a next allocated region in the first LU and additionally returns a predetermined specific status in the event that the next allocated region contains all zeros;
    wherein determining the processing strategy of the request of the write operation and performing the copy operation are both performed by a first layered driver in an I/O stack of the source array;
    wherein the first layered driver is inserted into the I/O stack of the source array for performing the copy operation, and subsequently removed from the I/O stack of the source array responsive to completion of the copy operation; and
    wherein the first layered driver performs the read next request by using an interface that is provided by a second layered driver contained within the I/O stack of the source array.

* * * * *